United States Patent
Edwards et al.

(10) Patent No.: US 9,983,871 B1
(45) Date of Patent: May 29, 2018

(54) APPLICATION BENCHMARKING

(71) Applicant: VMware, Inc., Palo Alto, CA (US)

(72) Inventors: Jeremiah Edwards, San Francisco, CA (US); Mohamad Khouja, Washington, DC (US)

(73) Assignee: VMWARE, INC., Palo Alto, CA (US)

( * ) Notice: Subject to any disclaimer, the term of this patent is extended or adjusted under 35 U.S.C. 154(b) by 83 days.

(21) Appl. No.: 15/018,409

(22) Filed: Feb. 8, 2016

Related U.S. Application Data

(60) Provisional application No. 62/113,328, filed on Feb. 6, 2015.

(51) Int. Cl.
G06F 9/44 (2018.01)
G06F 9/54 (2006.01)
H04L 29/08 (2006.01)

(52) U.S. Cl.
CPC .............. G06F 8/77 (2013.01); G06F 9/543 (2013.01); H04L 67/34 (2013.01)

(58) Field of Classification Search
None
See application file for complete search history.

(56) References Cited

U.S. PATENT DOCUMENTS 8,452,797 B1 * 5/2013 Paleja ............... G06Q 30/02
707/767

* cited by examiner

*Primary Examiner* — Qamrun Nahar
(74) *Attorney, Agent, or Firm* — Thomas | Horstemeyer, LLP

(57) ABSTRACT

Some embodiments of the invention provide a novel method for generating benchmarking metrics for applications that execute on computing devices (e.g., mobile devices). In some embodiments, the method collects data from numerous devices regarding the execution of numerous applications on these devices. For each particular application in a set of applications, the method of some embodiments identifies a group of applications that are similar to the particular application based on a set of criteria. This identification is without human intervention in some embodiments. From the collected data, the method generates a first set of reporting metrics for the identified group of applications, and provides the generated first set of reporting metrics to the developer of the particular application. In some embodiments, the method also provides to the developer a similar set of reporting metrics that the method generates from the collected data for the particular application. In this manner, the developer can compare the performance of the particular application with other similar applications.

21 Claims, 4 Drawing Sheets

APPLICATION BENCHMARKING

BACKGROUND

The mobile device industry has been growing for a number of years. The growth in the industry has led to a proliferation of many different types of mobile devices from various different vendors. A vendor may provide various different make and/or models of mobile devices to gain a competitive edge in the growing industry. For instance, the vendor may provide different smart phones and/or tablets that come in different sizes, with different specifications, etc. In addition, different mobile devices may come with different mobile operating systems or different versions of the same mobile operating system. Some vendors even modify a particular mobile operating system to add or remove specific features. The evolution of the mobile operating systems has even led to many other computing devices (e.g., game systems, media player appliances, etc.) adopting the mobile operating systems or modified versions thereof.

With the growth, there is an increasing demand for quality applications. The challenges that application developers face can be daunting. For example, to grow with the industry, the developers may have to write applications for different mobile operating systems. Different mobile operating systems will try to promote different programming languages (e.g., through their respective application programming interfaces (APIs), libraries, and/or frameworks). In addition, each different version of one mobile operating system may add and/or remove features (e.g., use different APIs).

Many application developers rely on user feedback to determine if there are any issues (e.g., performance issues) with their applications. Such user feedback may be valuable, but it may not provide the developers with (e.g., real-time) data about how their applications are performing across a number of different mobile devices (e.g., that are from different vendors and/or operate on different mobile operating systems). The user feedback may also not provide (e.g., at least in real-time and with minimum effort) detailed measurements of how their applications are performing across different mobile devices in relation to different services, such as cloud services, that the applications are using. Also, even when detailed measurements can be provided to a developer about the application's performance, these measurements might not be as useful when they are not provided in the proper context. Hence, there is a need to provide detailed measurements of an application's performance with the proper context.

BRIEF SUMMARY

Some embodiments of the invention provide a novel method for generating benchmarking metrics for applications that execute on computing devices (e.g., mobile devices). In some embodiments, the method collects data from numerous devices regarding the execution of numerous applications on these devices. For each particular application in a set of applications, the method of some embodiments identifies a group of applications that are similar to the particular application based on a set of criteria. This identification is without human intervention in some embodiments. From the collected data, the method generates a first set of reporting metrics for the identified group of applications, and provides the generated first set of reporting metrics to the developer of the particular application. In some embodiments, the method also provides to the developer a similar set of reporting metrics that the method generates from the collected data for the particular application. In this manner, the developer can compare the performance of the particular application with other similar applications.

In some embodiments, the method collects the data through a set of servers that gather performance data (e.g., error data, crash data, and/or service monitoring data) from the devices. For instance, in some embodiments, a client application (e.g., a thin client) executes on a mobile device to capture performance data for multiple applications, and this client application reports the captured data to server set. In other embodiments, a performance-monitoring agent is embedded in an application (e.g., through a library that is embedded pre-compilation or through a post-compilation application wrapping), and this agent reports the performance data that it captures for the application to the server set. In still other embodiments, the method uses a variety of different techniques on the same mobile device or on different mobile devices to capture performance data (e.g., on one mobile device, uses a thin-client to capture performance data for several applications, while using an embedded agent to capture performance data for another application).

The method of some embodiments computes statistical values on the data collected for the particular application and the group of applications along a set of data dimensions to generate at least a subset of metrics of the first and second sets of reporting metrics. In some embodiments, at least some of the computed statistical values are statistical average values (such as mean values, median values, mode values, etc.). To compute such values, the method of some embodiments identifies and discards outlier data values in different collected data sets (e.g., in data sets collected for different applications in same or different time periods, etc.). Examples of reporting metrics in some embodiments include crash reporting metrics, error reporting metrics, and/or service monitoring metrics. Some examples of such metrics are crash rate metrics, latency metrics, error rate metrics, data input/output rate metrics, and data request volume metrics.

In order to identify the group of similar applications, the method of some embodiments computes statistical values (e.g., average monthly active users over a three month period) on the data collected for the particular application and the group of applications along one or more data dimensions to generate metric values that quantify the set of criteria for identifying the group of applications that are similar to the particular application. Also, after identifying the group of similar applications, the method of some embodiments repeatedly collects more data from the applications in order to dynamically re-assess whether the identified group of applications should be modified (e.g., whether one or more applications should be added to or removed from the identified group) or whether the application should be a associated with a completely new group of applications that does not overlap with the previously identified group of similar applications.

In other words, after identifying one group of applications as being similar to the particular application at a first instance in time, the method of some embodiments continually collects and analyzes data from the plurality of mobile devices regarding the execution of the applications. Based on this continued analysis of the data, the method can dynamically without human intervention determine that the particular application is no longer similar to the first group of applications based on the set of criteria but rather is similar to a second group of applications based on the set of criteria. Alternatively, based on the continued analysis, the grouping module can dynamically identify one or more applications that are similar or no longer similar to the particular application, and then dynamically modify the group by adding or removing the dynamically identified application(s) to or from the group. The method then generates and provides reporting metrics based on the new or modified group of similar applications.

In addition to, or instead of, providing benchmark reporting metrics regarding the performance of applications that the method dynamically assess as similar based on the collected data, the method of some embodiments provides other reporting metrics. For instance, in some embodiments, the method generates different sets of reporting metrics regarding the operation of the particular application during different time periods (e.g., during the day versus during night, or before an application update or after an application update, etc.). Also, in some embodiments, the method generates and reports reporting metrics regarding other applications that execute on the same type of device, on the same type of operating system, and/or within the same wireless carrier network as the particular application.

The preceding Summary is intended to serve as a brief introduction to some embodiments of the invention. It is not meant to be an introduction or overview of all inventive subject matter disclosed in this document. The Detailed Description that follows and the Drawings that are referred to in the Detailed Description will further describe the embodiments described in the Summary as well as other embodiments. Accordingly, to understand all the embodiments described by this document, a full review of the Summary, Detailed Description, the Drawings and the Claims is needed. Moreover, the claimed subject matters are not to be limited by the illustrative details in the Summary, Detailed Description and the Drawing

BRIEF DESCRIPTION OF DRAWING

The novel features of the invention are set forth in the appended claims. However, for purposes of explanation, several embodiments of the invention are set forth in the following figures.

DETAILED DESCRIPTION

In the following detailed description of the invention, numerous details, examples, and embodiments of the invention are set forth and described. However, it will be clear and apparent to one skilled in the art that the invention is not limited to the embodiments set forth and that the invention may be practiced without some of the specific details and examples discussed.

Some embodiments of the invention provide a novel method for generating benchmarking metrics for applications that execute on computing devices. In some embodiments, the method collects data from numerous devices regarding the execution of numerous applications on these devices. For one particular application, the method of some embodiments identifies a group of applications that are similar to the particular application based on a set of criteria. This identification is without human intervention in some embodiments. From the collected data, the method generates a first set of reporting metrics for the identified group of applications, and provides the generated first set of reporting metrics to the developer of the particular application. In some embodiments, the method also provides to the developer a similar set of reporting metrics that the method generates from the collected data for the particular application. In this manner, the developer can compare the performance of the particular application with other similar applications.

Figure 1:
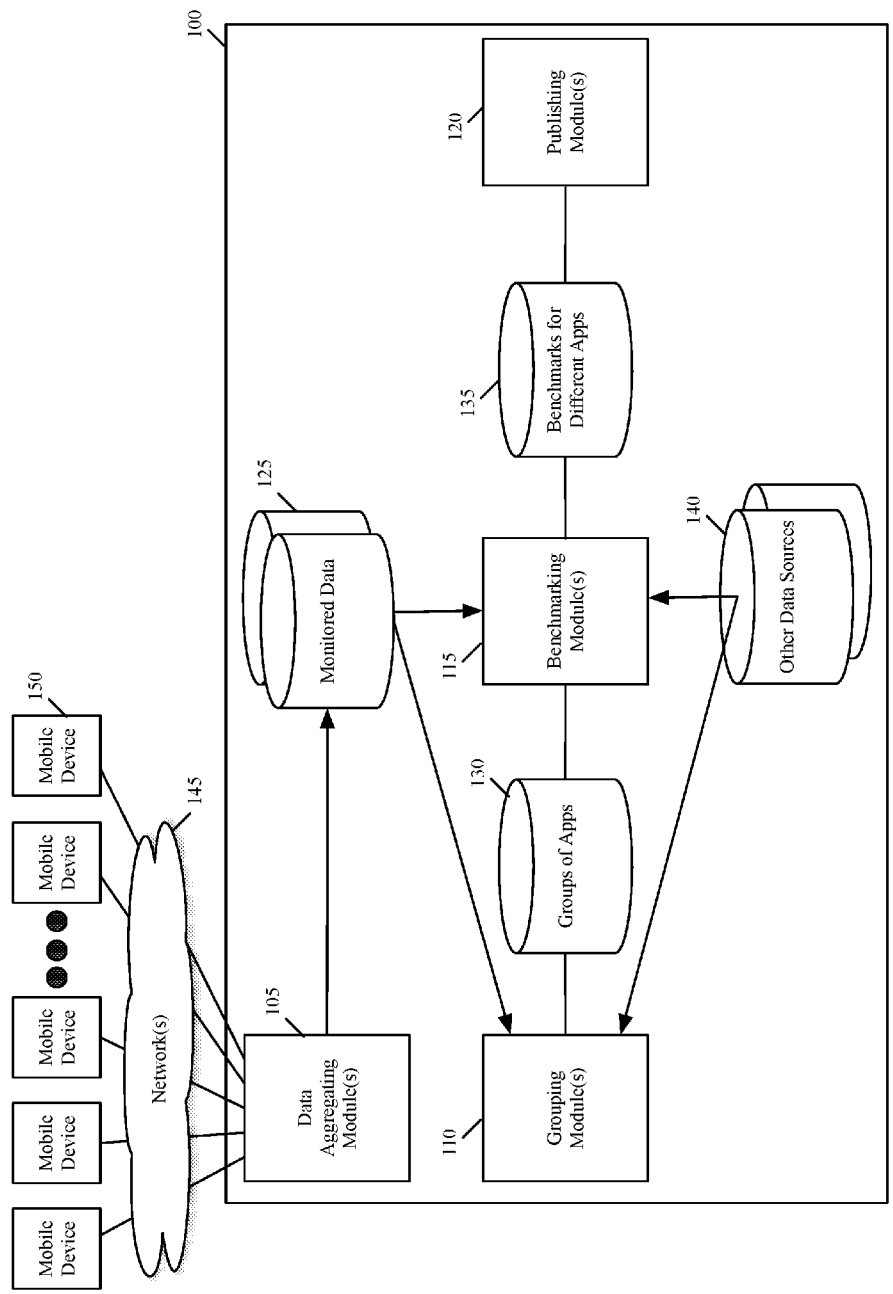
FIG. 1 illustrates a benchmarking system that implements the benchmarking method of some embodiments of the invention.

FIG. 1 illustrates a benchmarking system 100 that implements the benchmarking method of some embodiments of the invention. In some embodiments, the benchmarking system 100 generates benchmarking metrics for applications that execute on mobile devices. The mobile devices in some embodiments can be different types of devices (smartphones, tablets, etc.), can be from different vendors, and/or can execute different types of operating systems. One of ordinary skill will realize that in some embodiments, the benchmarking system collects performance data from, and generates benchmarking metrics for, applications that execute on non-mobile devices, such as servers, desktop computers, etc.

As shown, the system 100 includes data aggregating module(s) 105, application grouping module(s) 110, benchmarking module(s) 115, and publishing module(s) 120. Each of these types of modules is implemented by one or more servers in some embodiments of the invention. For instance, in some embodiments, one module is implemented by one or more virtual machines (VMs) or containers that executes on one or more host computing devices in one or more datacenters. In other embodiments, one or more of the modules are standalone server computers, VMs, and/or containers.

As further shown, the system 100 also includes monitored data storage(s) 125, application group data storage(s) 130, and benchmark metric data storage(s) 135. In some embodiments, each of these types of storages is implemented by one or more database servers. For instance, in some embodiments, each storage is a database VM or container that executes on a host computing device in a data center. In other embodiments, one or more of the data storages are standalone database server computers or are the data storages of the modules 105-120. In the discussion below, each type of module and each type of data storage is referred to in singular form, in order to simplify the writing. However, it is to be understood that whenever reference is made to a particular type of module or data storage of the system 100 in the discussion below, the module or data storage can be implemented as multiple modules or data storages.

The data aggregating module 105 continuously collects performance data regarding applications that execute on numerous mobile devices (e.g., thousand or millions of devices). Examples of such performance data include error data, crash data, and/or service monitoring data. Error data relates to errors that are encountered during the execution of the applications. Crash data describes crashes that occur during the execution of the applications.

Service monitoring data express services that applications use. An application may depend on a number of services, such as network services to access various cloud services. In some embodiments, a cloud service represents any service that an application needs to access a server through a network, such as the Internet, to provide data and/or retrieve data. Although this list is non-exhaustive, examples of different types of cloud services include a storage service (e.g., an image hosting service, a data backup service), a social network service, a media streaming service, a news service, a weather forecast service, a game service, a messaging service, etc.

In some embodiments, the monitored applications include native applications, carrier-based applications, third-party applications or other types of applications that execute on the mobile devices. As shown, the mobile devices communicate with the data aggregating module 105 through one or more networks 145, which in some embodiments include local area networks, local wireless networks (e.g., Wi-Fi networks), large area networks (e.g., wide area networks, wireless cellular networks, such as 3G and 4G networks), and network of networks (e.g., Internet).

Through one or more such network connections, data aggregating module 105 collects the performance data from the applications that execute on the mobile devices 150. To collect such data, the data in some embodiments is first captured on the mobile devices. Different embodiments capture data differently on the mobile devices. For instance, in some embodiments, a client application (e.g., a thin client) executes on a mobile device to capture performance data for multiple applications, and this client application reports the captured data to the data aggregating module 105. In other embodiments, a performance-monitoring agent is embedded in an application (e.g., through a library that is embedded pre-compilation or through a post-compilation application wrapping), and this agent reports the performance data that it captures for the application. In still other embodiments, the system 100 uses a variety of different techniques on the same mobile device or on different mobile devices to capture performance data (e.g., on one mobile device, uses a thin-client to capture performance data for several applications, while using an embedded agent to capture performance data for another application).

Through the network(s) 105, the data aggregating module 105 captures a myriad of performance data from the applications executing on the mobile devices 150. This data in some embodiments includes (1) error data (e.g., number of errors encountered during a time period), (2) crash data (e.g., number of application crashes during a time period), (3) number of times that the application has been started (i.e., loaded) during a time period, (4) number of times that the user has engaged with the application during a time period, (5) number of different service requests during a time period, (6) amount of bandwidth consumed by different service request during a time period, (7) latency data regarding the processing of different service requests during a time period, etc.

The data aggregating architectures that are used to implement the data aggregating module 105 of some embodiments is further described in U.S. Non-Provisional patent application Ser. No. 14/207,498, filed on Mar. 12, 2014; U.S. Non-Provisional patent application Ser. No. 14/207,501, filed on Mar. 12, 2014; U.S. Non-Provisional patent application Ser. No. 14/207,501, filed on Mar. 12, 2014; and U.S. Non-Provisional patent application Ser. No. 14/207,512, filed on Mar. 12, 2014. This module can also be implemented or provided by several commercially available service solutions, such as the error, crash, and service monitoring solutions offered by Crittercism Inc.

In some embodiments, the monitoring modules (e.g., the client application or monitoring agent) on the mobile devices report raw data and the data aggregating module 105 analyzes this data to produce processed monitored data. For instance, in some embodiments, a device monitoring module report timestamp data regarding when a service request was sent from a device and a response was received for the request from a server. From this time stamp data, the data aggregating module 105 generates latency data for the service request.

In some embodiments, the monitoring modules can report processed performance data. For example, in some embodiments, a device monitoring module reports a latency period for a service request, or an average latency period for a type of service request during a time period. In such cases, the data aggregating module 105 can simply store the reported performance data, or it can process this data with other reported data to produce more granular performance data. For instance, in some embodiments, the data aggregating module 105 can obtain different latency periods for different service requests and it can generate an average latency period for a service request type during a time period.

In another example, the aggregating module receives data regarding active uses of a particular application on a particular mobile device during a particular time period. From this data and previous such samples that it collected for the particular application on the mobile device, the aggregating module generates daily or monthly active use metric for the particular application on the mobile device. Also, from such an active use metric for the particular mobile device and other such data that it generates for other mobile devices, the aggregating module generates daily or monthly active use metric for the particular application on all monitored mobile device, all devices that are part of one carrier's network, all devices of the same type, etc.

Accordingly, in some embodiments, the data aggregating module gathers performance data from the monitoring modules on the mobile devices, analyzes this data to generate processed performance data, and stores the gathered and/or processed analyzed data in the monitored data storage 125. Even when it stores the gathered performance data, the data aggregating module in some embodiments performs operations to transform the reported data (e.g., performs data cleansing operations and/or extract, transform and load operations) so that the data can be stored in a normalized format with other types of stored performance data in the monitor storage 125.

The grouping module 110 identifies different groups of similar applications by analyzing the data stored in the monitored data storage 125. In some embodiments, the grouping module 110 can associate one application with multiple "similar" groups. To identify the different groups of similar applications, the grouping module in some embodiments identifies different sets of applications that have certain similar monitored performance data values. Specifically, the grouping module in some embodiments analyzes the performance data values of the applications along one set of data dimensions in order to identify one group of applications that have their performance data values along the set of dimensions within an acceptable set of threshold values.

For example, in some embodiments, the set of data dimensions includes just one dimension, which is the monthly active user (MAU) value. In some of these embodiments, the grouping module defines different particular ranges of defined MAU limits (e.g., less 100K users, 100K-250K users, 250K-500K users, etc.) as different application groups, and places applications in different groups based on their MAU data. The set of data dimensions for grouping applications includes more than one monitored performance data dimensions. For instance, in addition to using MAU values, the grouping module in some embodiments also uses the number of installed copies of an application to group applications into similar buckets. One example would define for applications that have less than 100K installed copies, several groups (such as OK-25K MAUs, 25K-50K MAUs, etc.), while defining for applications with 100K-500K installed copies, several other groups (such as OK-100K MAUs, 100K-250K MAUs, etc.).

After identifying groups of similar applications, the grouping module 110 of some embodiments repeatedly collects more data from the applications in order to dynamically re-assess whether the identified groups should be modified. For instance, after identifying one group of applications as being similar to the particular application at a first instance in time, the grouping module 110 of some embodiments continually collects and analyzes data from the plurality of mobile devices regarding the execution of the applications. Based on this continued analysis of the data, the grouping module can dynamically without human intervention determine that the particular application is no longer similar to the first group of applications based on the set of criteria but rather is similar to a second group of applications based on the set of criteria. Alternatively, based on the continued analysis, the grouping module can dynamically identify one or more applications that are no longer similar to the particular application, and thereby dynamically modify the group by removing the dynamically identified application(s) from the group. Conversely, based on the continued analysis, the grouping module can dynamically identify one or more new applications that are similar to the particular application, and thereby dynamically add the identified application(s) to the group.

In some embodiments, the grouping operation of the grouping module 110 is based on parameters other than performance data that is stored in the monitored data storage 125. For instance, as shown in FIG. 1, the grouping module 110 receives input from one or more other data sources 140 in some embodiments, and these other inputs can also determine how the grouping module identifies the groups of similar applications.

One of these other data sources 140 in some embodiments is a set of servers that provides a category for one or more applications. This server set in some embodiments is the server set that distributes the applications to the mobile devices (e.g., iTunes store, Google Play, etc.). Examples of the provided categories include: game, productivity, social networking, finance, education, food, sports, travel, etc. Also, in some embodiments, a category can have multiple sub-categories, e.g., the game category can have the following sub-category: kids, arcade, action, educational, etc. Applications can be associated with more than two hierarchical levels of categories and sub-categories in some embodiments.

In some embodiments, the grouping module bases its grouping operation on the categories and/or sub-categories that it receives for the applications from the other data sources 140. For instance, for each category of applications or each of several categories, the grouping module defines two or more groups based on the MAU metric of the applications. In this manner, a productivity application that approximately has 500K MAUs is benchmarked against other productivity applications with about 500K MAUs, and not with game applications that have about 500K MAUs.

Another input source on which the grouping module 110 bases its grouping operation in some embodiments is the application developer's input regarding the type of applications to benchmark the developer's applications against. For example, in some embodiments, a developer of a travel-related application will request that the application not only be benchmarked against other travel-related applications but also with productivity applications. Based on this data, the grouping application will group the travel-related application not only with other travel-related applications with MAUs similar to the developer's application, but also with productivity applications with similar MAUs.

In some embodiments, the grouping module 110 uses pre-defined or administrator-definable parameters for defining the different set of criteria (e.g., parameters or data dimensions) for grouping the applications. In other embodiments, however, some or all of the criteria in the criteria set can be automatically defined by the grouping module 110 without user input. For instance, when a new category of applications is created, the grouping module might initially start by grouping the applications into buckets that are based on small MAU ranges, e.g., less than 10K MAUs, 10K-25K MAUs, 25K-50K MAUs, 50K-100K MAUs, etc. However, once the average MAUs for a category increases past a certain threshold, the grouping module automatically adjusts its MAU ranges to be larger, e.g., less than 25K MAUs, 25K-100K MAUs, 100K-500K MAUs, etc.

Alternatively, in some embodiments, the grouping module 110 performs statistical analysis (e.g., stratified statistical sampling) on monitored performance data that is stored in the monitored data storage 125 to dynamically identify boundaries in the monitored data for grouping the applications. For instance, the grouping module 110 in some embodiments analyzes the MAU data for travel applications in order to identify dynamically boundaries in the MAU data that segment the applications into group sizes that meet certain desirable criteria. Using this approach, the grouping module might define one set of groups in one instance of time (e.g., 0-50K MAUs, 50K-150K MAUs, 150K-350K MAUs, 350K-600K MAUs, etc.), and another set of groups in another instance in time (e.g., 0-150K MAUs, 150K-500K MAUs, 500K+MAUs, etc.), based on the different statistics that it analyzes in the different instances of time.

The grouping module 110 stores the identities of the different groups that it defines in the grouping data storage 130. In some embodiments, the grouping module identifies the association of particular application with one or more groups by maintaining a data structure (e.g., a list or an array) for each application in which it stores the identifiers of each group that is associated with the application. Alternatively, or conjunctively, the grouping module in some embodiments maintains a data storage structure (e.g., a list or an array) for each group in which it stores the identities of the applications that are associated with the group.

The benchmarking module 115 generates benchmarking metrics for the applications based on their associated groups that are identified in the group data storage 130 and the performance data that is stored for the application in the monitored data storage 125. In some embodiments, the benchmarking module 115 computes statistical values on the data collected for the particular application and the group of applications along one set of data dimensions to generate at least a subset of reporting metrics that the system reports for the particular application. In some embodiments, this set of data dimensions overlaps with but is different than the set of data dimensions that the grouping module uses to identify similar applications. In other embodiments, the set of data dimensions that are used for the reporting metrics do not overlap with the set of data dimensions used for grouping the applications. In still other embodiments, the two sets are identical.

In some embodiments, at least some of the computed statistical reporting values are statistical average values (such as mean values, median values, mode values, etc.). To compute such values, the benchmarking module 115 of some embodiments identifies and discards outlier data values in different collected data sets (e.g., in data sets collected for different applications in same or different time periods, etc.). Examples of reporting metrics in some embodiments include crash reporting metrics, error reporting metrics, and/or service monitoring metrics. Some examples of such metrics are crash rate metrics, latency metrics, error rate metrics, data input/output rate metrics, and data request volume metrics.

In addition to providing benchmark reporting metrics regarding the performance of applications that the benchmarking module 115 dynamically assess as similar based on the collected data, this module 115 in some embodiments provides other reporting metrics. For instance, in some embodiments, the benchmarking module 115 generates different sets of reporting metrics regarding the operation of the particular application during different time periods (e.g., during the day versus during night, or before an application update or after an application update, etc.). Also, in some embodiments, the benchmarking module 115 generates and reports reporting metrics regarding other applications that execute on the same type of device, on the same type of operating system, and/or within the same wireless carrier network as the particular application.

The benchmarking module 115 stores the benchmarking metrics that it produces for the applications in the benchmarking data storage 135. In some embodiments, each set of benchmarking application that is stored for an application and a particular group of applications is indexed in the benchmarking data storage 135 by the identifiers of the application and the group. In other embodiments, the benchmarking data is stored differently in the benchmarking data storage 135.

Through the publishing module 120, the stored benchmark metrics can be published to the application developers. The publishing module 120 in some embodiments provides several methods for publishing such data. For example, in some embodiments, the publishing module provides one or more web pages on which an application developer can review benchmark metrics for one or more applications of the developer. Also, in some embodiments, the publishing module transmits the benchmark metrics to the developer through emails or other electronic messages. In other embodiments, the publishing module 120 publishes the benchmark metrics through other mechanisms.

In some embodiments, the publishing module has various views for displaying the benchmarking metric values. For instance, in some embodiments, the publishing module can display the benchmarking values as a list of measurements or statistics, such as the total number of requests (e.g., request volume), the average latency, user base or the number of people using the application, the number of service errors, and the average number of crashes. The publishing module can also show the benchmarking metric values graphically, such as line graphs, bar graphs, etc.

Figure 2:
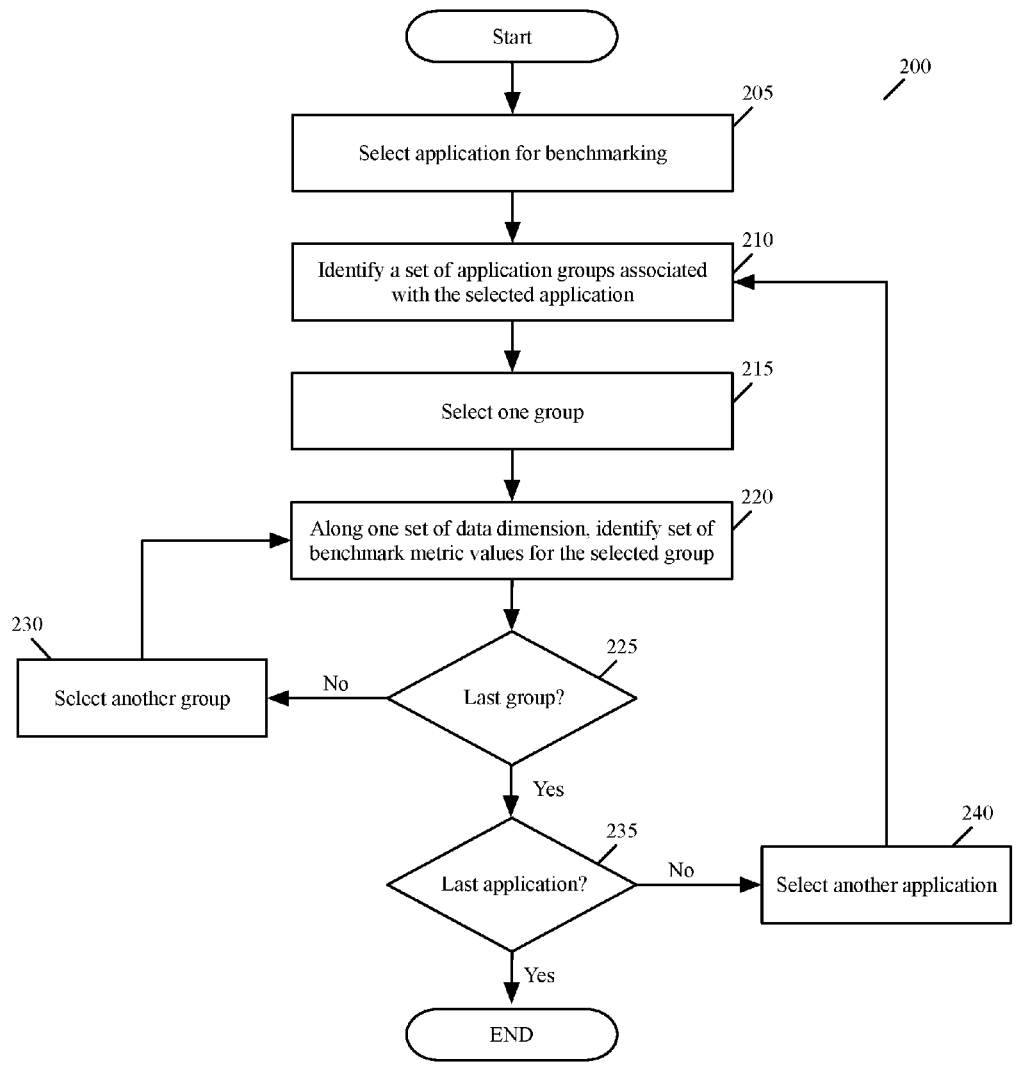
FIG. 2 presents a conceptual illustration of a process that the benchmarking module uses in some embodiment to generate benchmarking metrics for one or more applications.

FIG. 2 presents a conceptual illustration of a process 200 that the benchmarking module 115 uses in some embodiment to generate benchmarking metrics for one or more applications. In some embodiments, the benchmarking module 115 performs this process periodically (e.g., once every 12 hours, 24 hours, etc.). As shown, the process 200 initially selects (at 205) an application for which it should generate one or more sets of benchmarking metrics. In some embodiments, the selected application is from a pool of applications for which developers have subscribed to a benchmarking service of the system 100.

After 205, the process identifies (at 210) a set of one or more groups of applications that are associated with the application selected at 205. The identified set includes the groups that the grouping module 110 identifies as being similar to the selected application. In some embodiments, the identified set also includes other applications that are otherwise associated with the selected application. For instance, in some embodiments, the identified set includes (1) some or all applications that execute on a device or an operating system that is similar to the selected application's device or operating system, and/or (2) applications or class of applications identified by the selected application's developer for benchmarking with the selected application.

Next, at 215, the process 200 selects one of the groups identified at 215. The process then identifies (at 220) a set of benchmarking metric values for the selected group along one set of data dimensions. For the selected application, the process also identifies (at 220) the benchmarking metric values along the set of data dimensions. In some embodiments, the benchmarking metric values are computed at 220. In other embodiments, one or more of the benchmarking values are computed by the benchmarking module before 220. For example, the benchmarking values are computed on a group-by-group basis by a separate process of the benchmarking module 115 that periodically computes benchmarking metric values for each identified group of associated applications.

After 220, the process determines (at 225) whether it has examined all the groups identified at 210 for the selected application. If not, the process selects (at 230) another identified group, and then transitions back to 220 to compute a set of benchmarking metric values for the newly selected group along one set of data dimensions. In some embodiments, the process generates the benchmarking metric values for all groups associated with the selected application along one set of dimensions. In other embodiments, however, the process can generate the benchmarking metric values for different groups along different sets of data dimensions. For example, for the selected application, the process in some embodiments generates a first set of metric values for a first group of similar applications along a first set of data dimensions, while generating a second set of metric values for a second group of similar applications along a second set of data dimensions.

When the process determines (at 225) that it has examined all the groups identified at 210 for the selected application, the process determines (at 235) whether it has generated metric values for all applications for which it needs to generate benchmarking metric values. If so, the process ends. Otherwise, the process selects (at 240) another application and returns to 210 to identify the set of application groups for which it has to identify benchmark values for the newly selected application.

Figure 3:
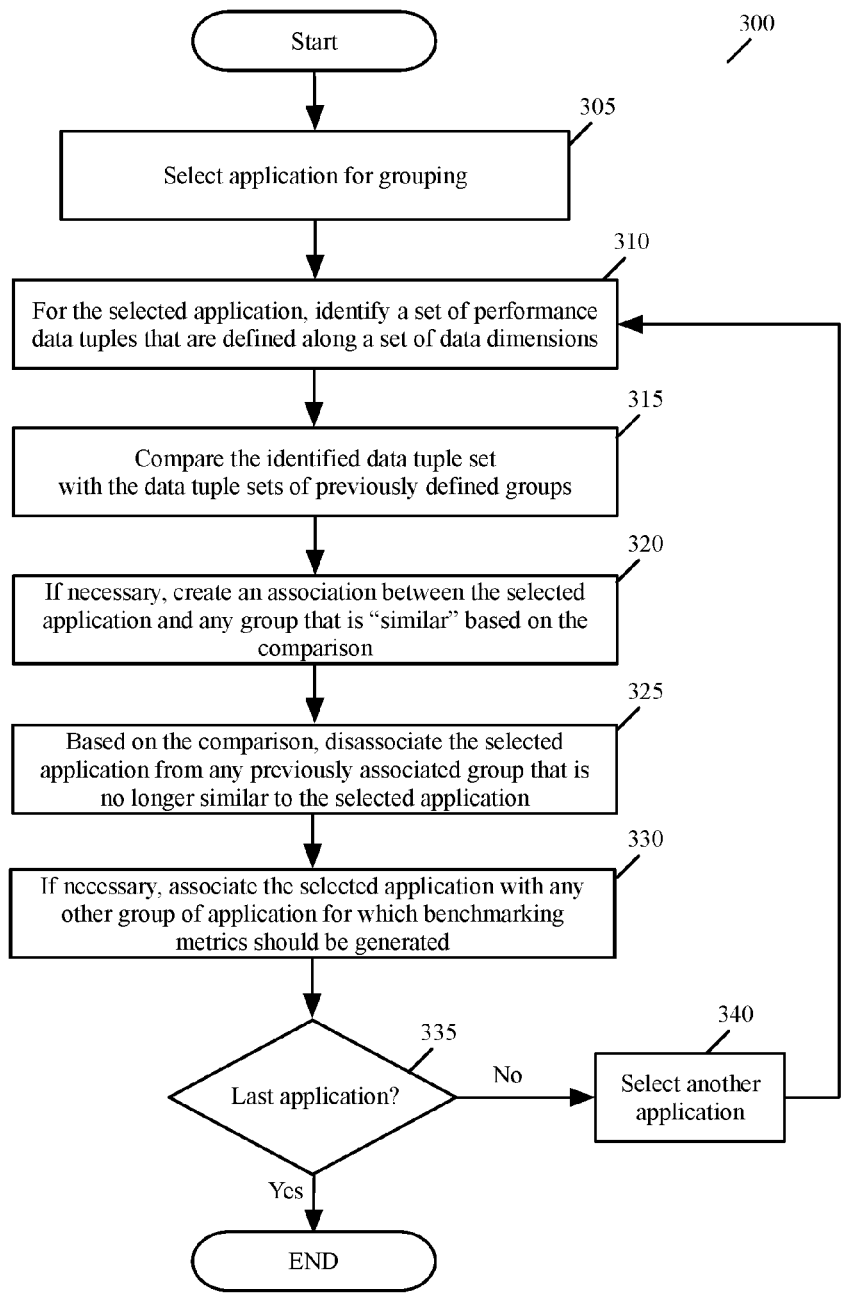
FIG. 3 presents a conceptual illustration of a process that the grouping module performs in some embodiments to identify one or more groups for each of several applications that the system has to generate benchmarking metrics.

FIG. 3 presents a conceptual illustration of a process 300 that the grouping module 110 performs in some embodiments to identify one or more groups for each of several applications that the system 100 has to generate benchmarking metrics. In some embodiments, the benchmarking module 115 performs this process periodically (e.g., once every 12 hours, 24 hours, etc.). As shown, the process 300 initially selects (at 305) an application for which benchmarking metrics needed to be computed. In some embodiments, the selected application is from a pool of applications for which developers have subscribed to a benchmarking service of the system 100.

Next, at 310, the process 300 retrieves from the monitored data storage 125 a set of monitored data values for the selected application. This set is defined along a set of data dimensions, which are collectively, individually, or in different subsets used to identify one or more groups of applications that are similar to the selected application. For example, for the selected application, the process 300 in some embodiments (1) uses performance values along one data dimension to identify one group of similar applications, (2) use performance values along N data dimensions to identify another group of similar applications, (3) use performance values along M data dimensions to identify still another group of similar applications, etc.

After 310, the process compares (at 315) the retrieved monitored data values of the selected application with the monitored data values that the monitored data storage 125 stores for other applications and/or for other groups of applications that the grouping module previously identified. The purpose of this comparison is to identify other applications or groups of applications that have monitored data values that are close enough to the selected application's monitored data values, so that the other applications or groups of applications can be viewed as being similar to the selected application.

The process 300 in some embodiments can identify (at 315) multiple groups of similar applications for the selected application by comparing different subsets of the monitored data values that it retrieves (at 310) for the selected application with the corresponding monitored data value subsets of one or more applications and/or groups of applications. As mentioned above, each of the examined subsets of monitored data values can be defined along a different subset of data dimensions, some of which might be monitored data dimensions while others are non-monitored data dimensions (e.g., specified categories or sub-categories of applications).

Different embodiments use different techniques to identify a group of applications that are similar to another to each other. For instance, in some embodiments, one group of applications can be viewed as similar based on the proximity of their performance data values along one dimension (e.g., their MAUs). Also, in some embodiments, applications can be viewed as being similar based on the similarities between two or more monitored data dimensions. For example, some embodiments compute a similarity metric based on MAUs and crash rates. In some of these embodiments, the process 300 computes a similarity value S for the selected application and a group of applications as follows:

$$S = W1*\text{abs}[MAU_{APP} - MAU_{GROUP}] + W2*\text{abs}[CR_{APP} - CR_{GROUP}],$$

where W1 and W2 are weighting factors, abs signifies the absolute value of the bracketed difference value, $MAU_{APP}$ is the MAU of the selected app, $MAU_{GROUP}$ is the MAU of the group, $CR_{APP}$ is the crash rate of the application, and $CR_{GROUP}$ is the crash rate of the group. When the S value of an application with respect to a group is below a certain value, then the group is viewed as being similar to the application. The spirit of the similarity metric above can be implemented in many different forms and/or processes. Also, other embodiments implement different mathematical expressions to represent the similarity of a group of applications.

If necessary, the process creates (at 320) an association between the selected application and any set of applications and/or groups of applications that are deemed to be similar to the selected application based on the comparisons that the process 300 performs at 315. It is necessary to create such an association when such an association was not previously defined. Each such association defines one group of applications that is similar to the selected application. As mentioned above, different embodiments use different techniques (e.g., arrays, lists, pointers, etc.) to create an association between a particular application and a set of other applications that should be grouped with the particular application.

In some cases, the monitored performance data shows that the selected application is no longer similar to a set of applications that were previously identified as being similar to the selected application. Accordingly, at 325, the process eliminates the association between the selected application and any set of applications and/or groups of applications that no longer can be deemed to be similar to the selected application based on the comparisons that the process 300 performs at 315.

As the grouping module periodically performs the process 300, the operations at 320 and 325 allow the grouping(s) of the selected application to be dynamically adjusted based on changes to the monitored performance data of the applications. In some embodiments, the process 300 can dynamically adjust (at 320 or 325) the selected application's grouping by adding the selected application to a previously defined group of applications, removing the selected application from a previously defined group of applications, creating a group of similar applications that includes the selected application, eliminating a previously defined group of applications that are no longer similar.

In some embodiments, the grouping module can define one or more groups for the selected application that are not based on the monitored performance data that is stored in the monitored data storage 125. For instance, in some cases, an application needs to be benchmarked with all other applications that execute on the same operating system, or all applications that are in a similar category and that execute on the same operating system. To address such groupings, the process 300 when necessary, creates (at 330) one or more groups for the selected application with other applications without using the monitored performance data. Such groupings are necessary when they are needed and have not been previously defined. In some embodiments, the process 300 does not perform the operation 330 because it can use one or more attributes of an application (e.g., an operating system identifier) to identify in real time other applications when it needs to generate benchmarking metrics for these other applications.

At 335, the process determines whether it has examined all applications for which it needs to identify similar group(s) of applications. If so, the process ends. Otherwise, the process selects another application, and transitions back to 310 to repeat its operations to identify and/or examine groupings for the selected application.

FIGS. 2 and 3 conceptually illustrate processes 200 and 300. The specific operations of these processes may not be performed in the exact order shown and described. The specific operations may not be performed in one continuous series of operations, and different specific operations may be performed in different embodiments. For instance, in some embodiments, the process 300 performs operations 310-325 in multiple iterations for a selected application, with each iteration focusing on one subset of performance data values for grouping the selected application. Furthermore, the process could be implemented using several sub-processes, or as part of a larger macro process.

Also, other embodiments use other processes for grouping applications and/or benchmarking the grouped applications. For example, some embodiments group the applications, compute benchmarking metric values for each group of applications, and then just provide for each application, its benchmarking metric values along with the benchmarking values of one or more groups that contain the application.

Figure 4:
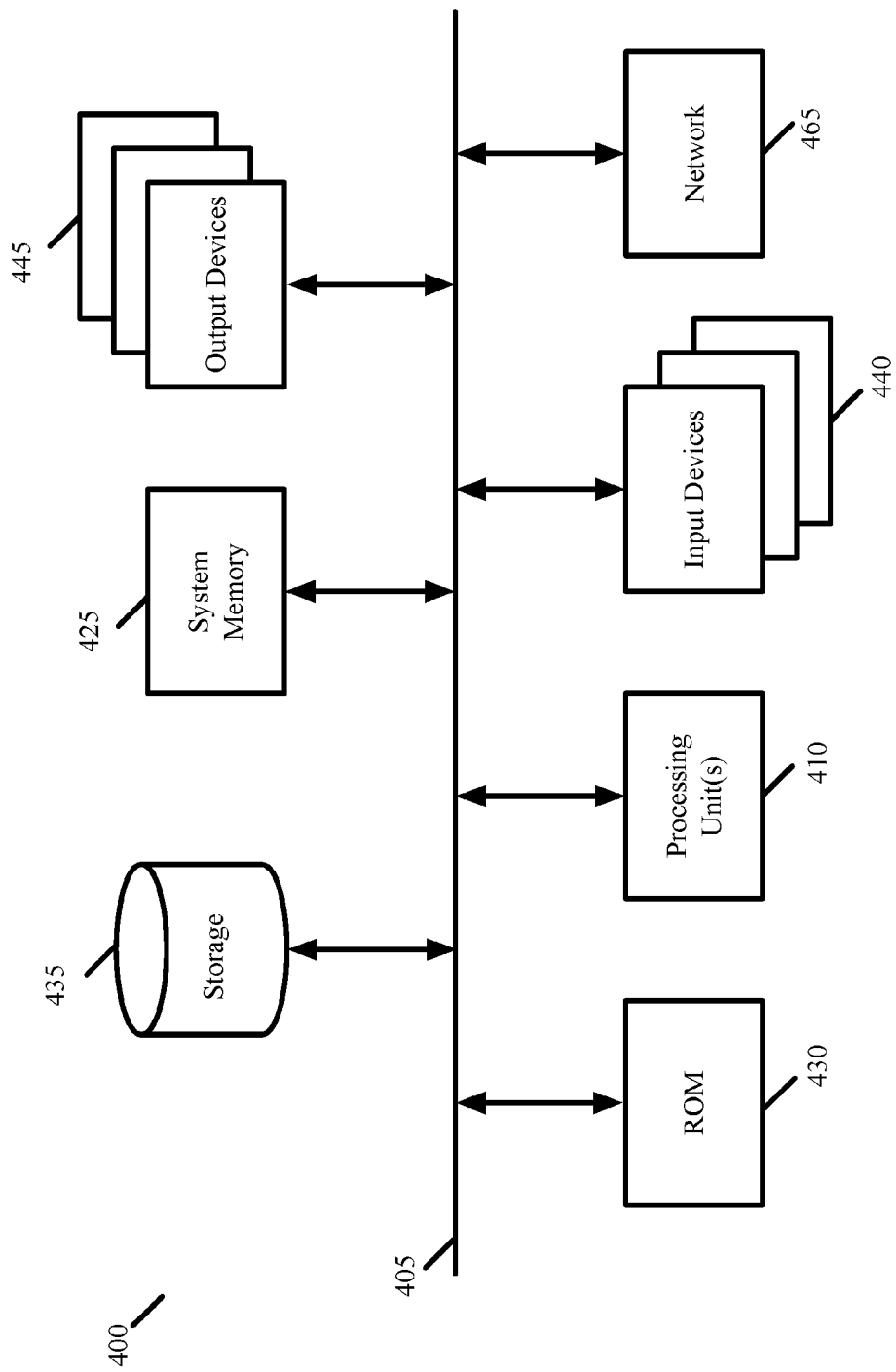
FIG. 4 conceptually illustrates an electronic system with which some embodiments of the invention are implemented.

FIG. 4 conceptually illustrates an electronic system 400 with which some embodiments of the invention are implemented. The electronic system 400 may be a computer (e.g., a desktop computer, personal computer, tablet computer, server computer, mainframe, a blade computer etc.), or any other sort of electronic device. This electronic system can be the computer (e.g., server, desktop computer, etc.) that executes some embodiments of the invention. As shown, the electronic system includes various types of computer readable media and interfaces for various other types of computer readable media. Specifically, the electronic system 400 includes a bus 405, processing unit(s) 410, a system memory 425, a read-only memory 430, a permanent storage device 435, input devices 440, and output devices 445.

The bus 405 collectively represents all system, peripheral, and chipset buses that communicatively connect the numerous internal devices of the electronic system 400. For instance, the bus 405 communicatively connects the processing unit(s) 410 with the read-only memory 430, the system memory 425, and the permanent storage device 435. From these various memory units, the processing unit(s) 410 retrieve instructions to execute and data to process in order to execute the processes of the invention. The processing unit(s) may be a single processor or a multi-core processor in different embodiments.

The read-only-memory (ROM) 430 stores static data and instructions that are needed by the processing unit(s) 410 and other modules of the electronic system. The permanent storage device 435, on the other hand, is a read-and-write memory device. This device is a non-volatile memory unit that stores instructions and data even when the electronic system 400 is off. Some embodiments of the invention use a mass-storage device (such as a magnetic or optical disk and its corresponding disk drive) as the permanent storage device 435.

Other embodiments use a removable storage device (such as a floppy disk, flash drive, etc.) as the permanent storage device. Like the permanent storage device 435, the system memory 425 is a read-and-write memory device. However, unlike storage device 435, the system memory is a volatile read-and-write memory, such a random access memory. The system memory stores some of the instructions and data that the processor needs at runtime. In some embodiments, the invention's processes are stored in the system memory 425, the permanent storage device 435, and/or the read-only memory 430. From these various memory units, the processing unit(s) 410 retrieve instructions to execute and data to process in order to execute the processes of some embodiments.

The bus 405 also connects to the input and output devices 440 and 445. The input devices enable the user to communicate information and select commands to the electronic system. The input devices 440 include alphanumeric keyboards and pointing devices (also called "cursor control devices"). The output devices 445 display images generated by the electronic system. The output devices include printers and display devices, such as cathode ray tubes (CRT) or liquid crystal displays (LCD). Some embodiments include devices such as a touchscreen that function as both input and output devices.

Finally, as shown in FIG. 4, bus 405 also couples electronic system 400 to a network 465 through a network adapter (not shown). In this manner, the computer can be a part of a network of computers (such as a local area network ("LAN"), a wide area network ("WAN"), or an Intranet, or a network of networks, such as the Internet. Any or all components of electronic system 400 may be used in conjunction with the invention.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some embodiments are performed by one or more integrated circuits, such as application specific integrated circuits (ASICs) or field programmable gate arrays (FPGAs). In some embodiments, such integrated circuits execute instructions that are stored on the circuit itself.

As used in this specification, the terms "computer", "server", "processor", and "memory" all refer to electronic or other technological devices. These terms exclude people or groups of people. For the purposes of the specification, the terms display or displaying means displaying on an electronic device. As used in this specification, the terms "computer readable medium," "computer readable media," and "machine readable medium" are entirely restricted to tangible, physical objects that store information in a form that is readable by a computer or electronic device. These terms exclude any wireless signals, wired download signals, and any other ephemeral or transitory signals.

While the invention has been described with reference to numerous specific details, one of ordinary skill in the art will recognize that the invention can be embodied in other specific forms without departing from the spirit of the invention. Therefore, one of ordinary skill in the art would understand that the invention is not to be limited by the foregoing illustrative details, but rather is to be defined by the appended claims.

We claim:

1. A method comprising:
from a plurality of mobile devices, collecting data regarding execution of a plurality of applications on the mobile devices;

for one particular application, identifying a group of applications that are similar to the particular application based on a set of criteria, wherein the set of criteria comprises a quantity of monthly active users and the group of applications are grouped according to a similarity in the quantity of monthly active users;

from the collected data, generating a first set of reporting metrics for the identified group of applications; and providing the generated first set of reporting metrics to the developer of the particular application.

2. The method of claim 1 further comprising:

for the particular application, generating a second set of reporting metrics from the collected data that comprises one metric for each metric in the first set of reporting metrics;

providing the second set of reporting metrics to the particular application's developer for the developer to compare with the first set of metrics.

3. The method of claim 2, wherein the first and second sets of reporting metrics are provided together in one report.

4. The method of claim 2, wherein generating the first and sets of reporting metrics comprises:

performing statistical computations on the data collected for the particular application and the group of applications along a first set of data dimensions to generate at least a subset of metrics of the first and second sets of reporting metrics.

5. The method of claim 4, wherein the performing statistical computation comprises performing statistical average computation.

6. The method of claim 5, wherein the statistical average computations include at least one of mean computations, median computations, and mode computations.

7. The method of claim 5, wherein performing statistical computation comprises:

identifying and discarding outlier data values in the data collected for each of at least a subset of the application.

8. The method of claim 4, wherein the reporting metrics includes at least two of crash rate metrics, latency metrics, error rate metrics, data input/output rate metrics, and data request volume metrics.

9. The method of claim 4, wherein the reporting metrics include at least crash reporting metrics, error reporting metrics, and service monitoring metrics.

10. The method of claim 4, wherein identifying the group of applications comprises:

performing statistical computations on the data collected for the particular application and other applications along a second set of data dimensions to generate at least metric values that quantify the set of criteria for identifying the group of applications that are similar to the particular application.

11. The method of claim 10 further comprising:

after identifying the group of similar applications, performing statistical computations repeatedly in order to dynamically assess whether the particular application is no longer similar to the identified group of applications and should be associated with another group of applications.

12. The method of claim 10 further comprising:

after identifying the group of similar applications, performing statistical computations repeatedly in order to dynamically assess whether one or more applications in the identified group of applications should be added to or removed from the group of applications.

13. The method of claim 1, wherein the group is a first group, the method further comprising:

repeatedly collecting and analyzing data from the plurality of mobile devices regarding the execution of the applications;

based on the analysis of the collected data, dynamically determining that the particular application is no longer similar to the first group of applications based on the set of criteria but rather is similar to a second group of applications based on the set of criteria;

generating a second set of reporting metrics for the second group of applications;

providing the generated second set of reporting metrics to the developer of the particular application.

14. The method of claim 13, wherein dynamically determining comprises automatically determining without human intervention that the particular application is no longer similar to the first group of applications based on the set of criteria but rather is similar to a second group of applications based on the set of criteria.

15. The method of claim 1 further comprising:

from the collected data, generating a second set of reporting metrics relating to the operation of particular application in a first time period;

from the collected data, generating a third set of reporting metrics relating to the operation of particular application in a second time period;

providing the second and third sets of reporting metrics along with the first set of reporting metrics to the developer of the particular application.

16. The method of claim 1, wherein the particular application executes on a particular device, the method further comprising:

from the collected data, generating a second set of reporting metrics relating to the operation of applications on devices from the same manufacturer as the particular device;

providing the second set of reporting metrics along with the first set of reporting metrics to the developer of the particular application.

17. The method of claim 1, wherein the particular application executes on a particular operating system, the method further comprising:

from the collected data, generating a second set of reporting metrics relating to the operation of applications on devices that execute the particular operating system;

providing the second set of reporting metrics along with the first set of reporting metrics to the developer of the particular application.

18. The method of claim 1, wherein the particular application executes on a particular device that operates within one wireless carrier's network, the method further comprising:

from the collected data, generating a second set of reporting metrics relating to the operation of applications on devices within the wireless carrier's network;

providing the second set of reporting metrics along with the first set of reporting metrics to the developer of the particular application.

19. A system comprising:

a first set of servers for collecting from a plurality of mobile devices, data regarding execution of a plurality of applications on the mobile devices;

a second set of servers for associating one particular application with a group of applications that are similar to the particular application based on a set of criteria, wherein the set of criteria comprises a quantity of monthly active users and the group of applications are grouped according to a similarity in the quantity of monthly active users;

a third set of servers for generating a first set of reporting metrics for the identified group of applications;

a fourth set of servers for providing the generated first set of reporting metrics to the developer of the particular application.

20. The system of claim 19 wherein the third set of servers for generating for the particular application, a second set of reporting metrics that comprises one metric for each metric in the first set of reporting metrics;

the fourth set of servers for providing the second set of reporting metrics to the particular application's developer for the developer to compare with the first set of metrics.

21. The system of claim 19, wherein the group is a first group, the first set of servers repeatedly collects in a time period, data from the plurality of mobile devices regarding the execution of the particular application;

based on the analysis of the data collected for the particular application, the second set of servers determining that the particular application should be associated with a second group of applications that are similar to the particular application based on the set of criteria and associating the particular application to the second group of applications;

the third set of servers is further for generating a second set of reporting metrics for the second group of applications;

the fourth set of servers is further for providing the generated second set of reporting metrics to the developer of the particular application.

* * * * *